Dec. 12, 1950     L. F. BLACKWELL     2,533,550
TEA CUTTING AND FEEDING MECHANISM
Filed March 27, 1947
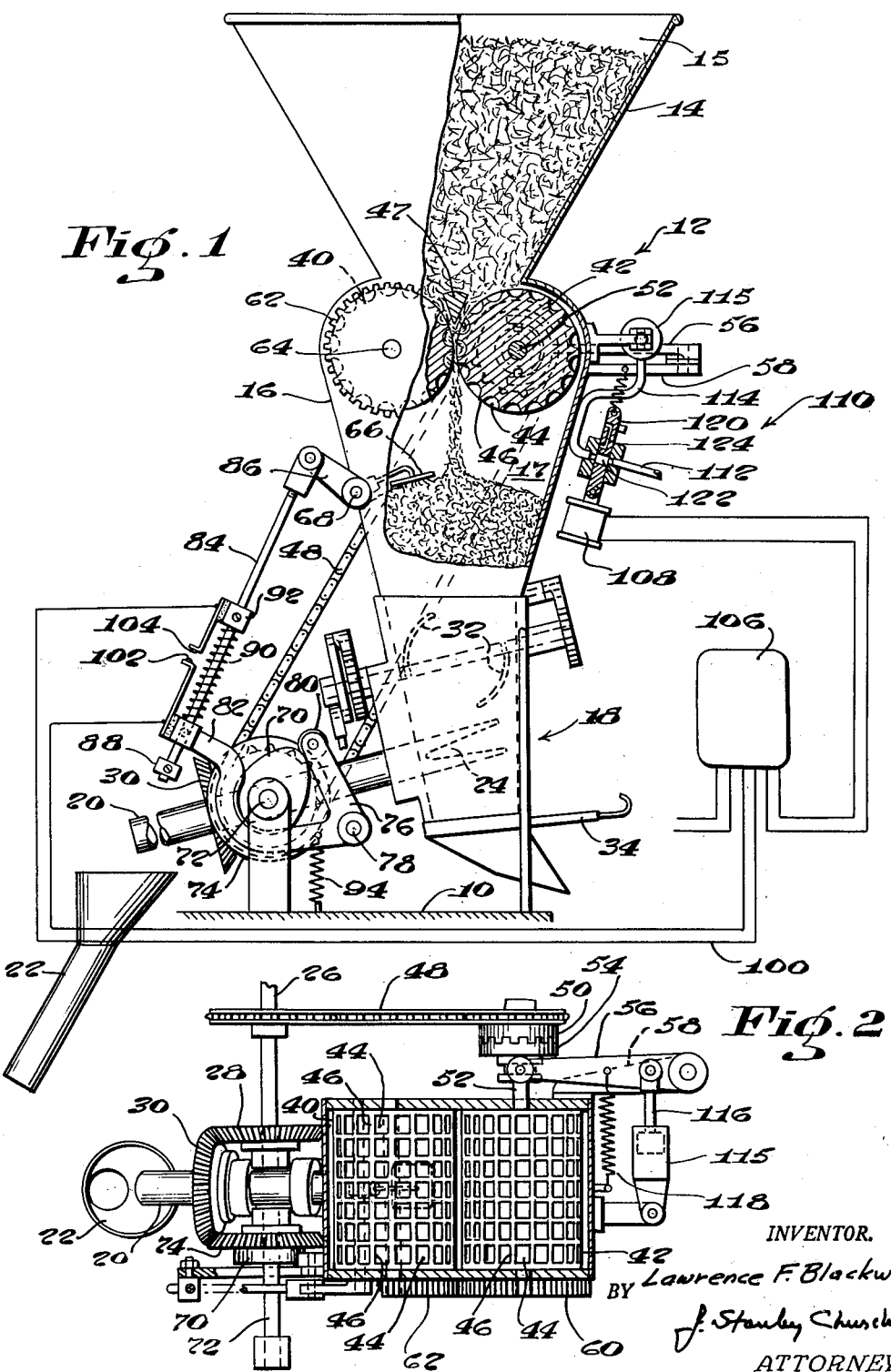
INVENTOR.
Lawrence F. Blackwell
BY J. Stanley Churchill
ATTORNEY

Patented Dec. 12, 1950

2,533,550

UNITED STATES PATENT OFFICE 2,533,550

TEA CUTTING AND FEEDING MECHANISM

Lawrence F. Blackwell, Wollaston, Mass., assignor to Pneumatic Scale Corporation, Limited, Quincy, Mass., a corporation of Massachusetts Application March 27, 1947, Serial No. 737,658

9 Claims. (Cl. 146—122)

This invention relates to a tea cutting and feeding mechanism particularly adapted for use with a tea bagging machine.

The invention has for an object to provide a novel and improved tea cutting and feeding mechanism adapted for cooperation with a tea bagging machine and in which provision is made for cutting or breaking a supply of uncut tea to a size suitable for packaging and for feeding the cut tea in a substantially uniform and continuous stream to be delivered to the tea bagging mechanism.

With this general object in view and such others as may hereinafter appear, the invention consists in the tea cutting and feeding mechanism and in the various structures, arrangements and combinations of parts hereinafter described and particularly defined in the claims at the end of this specification.

In practice, the bulk tea as received by the tea packer comprises dried tea leaves of varying lengths, many of which may be one inch or more in length and such uncut tea is unsuitable for handling in tea bagging machines. Prior to the present invention it was necessary to cut or break up the tea leaves into smaller lengths before introducing it into the tea feeding hopper in order to conveniently feed a uniform stream of the tea and also to permit the tea to be packaged in relatively small individual packages.

The present invention contemplates novel apparatus adapted for use in receiving a bulk supply of uncut tea, for cutting or breaking the same and then feeding the cut tea to the tea bagging machines. Provision is also preferably made in the present tea cutting and feeding apparatus for automatically controlling the operation of the tea cutting unit in accordance with the accumulated supply of cut tea and discontinuing the operation of the cutting unit when a predetermined supply of the cut tea has accumulated and for again starting the cutting unit in operation after a predetermined time has elapsed. In operation during successive intervals when the tea cutting unit is not in operation, the supply of cut tea is gradually withdrawn as it is fed to the tea bagging machine, so that an over accumulation of cut tea is avoided while insuring an ample supply to produce a continuous feed to the tea bagging machine.

Referring now to the drawings, the present tea cutting and feeding mechanism is herein illustrated as mounted on a platen 10 forming part of a tea bagging machine, which may comprise any of the commercial tea bagging machines now upon the market such as the pouch type tea bagging machine illustrated and described in the patent to Doble No. 1,726,060, patented August 27, 1929, or, the envelope type tea bagging machine illustrated and described in the patent to Patterson No. 2,361,052, October 24, 1944.

As herein illustrated the present tea cutting and feeding mechanism comprises a tea cutting unit, indicated generally at 12 arranged to cut or break up a bulk supply of the uncut tea contained in a supply hopper 14 and to discharge the cut tea into a second hopper 16 from which the tea is withdrawn by a tea feeding unit indicated generally at 18. The tea feeding unit 18 includes a rotatable feeding tube 20, preferably of the worm screw type, disposed at the lower end of the hopper 16, arranged to effect withdrawal of a continuous uniform stream of the cut tea and to deposit the stream into a guide funnel 22 arranged to guide the tea into the forming and filling tube of the tea bagging mechanism, not shown. The end of the feeding tube 20 extending within the hopper 16 is preferably provided with an elongated V-shaped slotted portion 24 arranged to permit the tea to freely enter the tube and to effect a substantially uniform withdrawal therefrom. As herein illustrated, the hoppers 14 and 16 are preferably formed integrally to provide an upper chamber 15 for the uncut tea and a lower chamber 17 for the cut tea, the cutting rollers 40, 42 being disposed between the chambers to receive the uncut tea from the upper chamber and to discharge the cut tea into the lower chamber to be withdrawn by the rotatable feeding tube 20. The term "cutting" as herein employed in the specifications and claims is intended to include either cutting, breaking, separating or dividing the relatively long tea leaves, as received by the packer, into relatively shorter lengths suitable for use in a tea bagging machine.

The feeding tube 20 may and preferably will be continuously rotated through connections from the tea bagging machine which includes a drive shaft 26 having a bevel gear 28 cooperating with a bevel gear 30 fast on the tube 20. The hopper 16 may also be provided with the usual rotatable stirrers 32 for maintaining the tea in a loose and free flowing condition, and, the bottom of the hopper may be provided with a slidable closure 34 for use when it is desired to entirely empty the hopper.

The tea cutting unit 12, as herein shown, comprises a pair of cooperating rollers 40, 42 provided with a plurality of radially and laterally spaced semi-circular grooved portions 44 forming in effect a plurality of cooperating toothed portions 46 arranged to press the tea passing therebetween from the supply hopper. The dried and relatively brittle tea leaves are thus broken up to a size suitable for packaging and particularly for tea bagging purposes. The radially and laterally spaced disposition of the grooved portions 44 effects breaking of the uncut tea passing therebetween in either a horizontal, vertical or diagonal position. A V-shaped guide bar 47 disposed between the entrance to the rollers 40, 42 is arranged to guide and control the flow of uncut tea passing between the cutting rollers to prevent jamming thereof.

The tea cutting or breaking rollers 40, 42 are also arranged to be rotated through connections from the tea bagging machine, and as herein shown the drive shaft 26 is provided with a chain and sprocket drive 48 to one member 50 of a clutch unit, the member 50 being rotatably mounted on a shaft 52 upon which the cutting roller 42 is mounted. The second member 54 of the clutch unit may be slidably keyed to the shaft 52 and is arranged to be shifted into and out of cooperation with the member 50 by an arm 56 pivotally mounted in a bracket 58 attached to the hopper. The other end of the shaft 52 is provided with a gear 60 cooperating with a gear 62 fast on the shaft 64 on which the roller 40 is mounted whereby to effect simultaneous rotation of the rollers 40 and 42 in opposite directions.

Provision is made for starting and stopping the cutting rollers 40, 42 in accordance with the demand for cut tea in the hopper 16 and, as herein shown, a cam operated feeler plate 66 disposed within the hopper and pivotally mounted on a shaft 68 is arranged to be rocked into and out of feeling position and into engagement with the cut tea when the latter reaches a predetermined or maximum level in the hopper 16. The feeler plate 66 is rocked by a cam 70 fast on a shaft 72 arranged to be driven from the bevel gear 30 on the feeding tube 20 by a cooperating bevel gear 74 also fast on the shaft 72. One arm 76 of a bell crank pivotally mounted at 78 is provided with a roller 80 cooperating with the cam 70 and the second arm 82 of the bell crank is connected by a yieldable connection including a link 84 to an arm 86 fast on the feeler plate shaft 68. As herein shown, the lower end of the link 84 is slidable in the arm 82 and is provided with a collar 88 for engagement by the arm to effect upward rocking of the feeler plate 66. A spring 90 coiled about the link 84 and interposed between the arm 82 and a second collar 92 effects a yieldable rocking of the feeler plate against the top of the accumulated supply of cut tea in the hopper 16. A spring 94 is arranged to urge the roller 80 against its cam 70.

In order to discontinue the operation of the cutting rollers 40, 42 when the supply of cut tea has reached a predetermined maximum height in the hopper 16, as detected by the feeler plate 66, control mechanism is provided including an electrical circuit 100 having a pair of contacts 102, 104 attached to the arm 82 and the collar 92 respectively. The contacts 102, 104 are normally separated by virtue of the interposed spring 90 and are arranged to be closed when the feeler plate 66 is yieldingly held in its upwardly rocked position by engagement with the top of the accumulated supply of cut tea in the hopper. The electrical circuit further includes a time delay relay of any usual construction indicated generally at 106, and a solenoid 108 arranged to operate an air valve 110 connected to any suitable source of compressed air by a tube 112. A second tube 114 is connected to an air cylinder 115 having a piston 116 connected to the clutch shifter arm 56. A spring 118 connected to the arm 56 tends to urge the clutch member 54 in a direction to disengage the clutch and the piston 116 is arranged to urge the clutch member 54 into operative engagement with the clutch member 50.

With this construction it will be seen that in the operation of the mechanism, when the contacts 102, 104 are closed the solenoid 108 will be energized through the time delay relay to effect shifting of the valve member 120 from the position illustrated, in which a port 122 connects the air tube 112 to the tube 114, to a position in which the tube 114 is in communication with a vent passage 124, thus relieving the air cylinder and permitting the spring 118 to effect disengagement of the clutch. Since the engagement of the contacts 102, 104 is only instantaneous, the time delay relay 106 serves to maintain the circuit to the solenoid closed for a predetermined length of time, during which time the tea is being withdrawn from the hopper, whereupon the circuit is again opened at the relay to again permit the rollers to start and to continue in operation until the circuit 100 is again closed through the contacts 102, 104, as described.

From the above description it will be observed that the present tea cutting and feeding mechanism is particularly adapted for use with a tea bagging machine and that the provision of a cutting unit in the mechanism permits the uncut tea leaves as received by the packer to be deposited directly into the mechanism to be broken up to a size suitable to be fed and handled in commercial tea bagging machines and to be packaged in relatively small individual containers. In practice, it is desirable that the size of the cut tea leaves be approximately from one-eighth to one-quarter inches in length.

While the preferred embodiment of the invention has been herein illustrated and described, it will be understood that the invention may be embodied in other forms within the scope of the following claims.

Having thus described the invention, what is claimed is:

1. In a device of the character described, in combination, a hopper for containing a bulk supply of uncut tea, tea cutting rollers associated with said hopper, a second hopper communicating with said first hopper and arranged to receive the cut tea discharged by said cutting rollers, means for continuously withdrawing and feeding the cut tea from said second hopper, and means for controlling the operation of said cutting rollers in accordance with the supply of cut tea in said second hopper, said control means including a cam-operated feeler plate arranged to be restrained in its movement by engagement with the top of the accumulated pile of material in said second hopper, and means operatively connected to said feeler plate for terminating the operation of said cutting rollers when the feeler plate is thus restrained.

2. In a device of the character described, in combination, a hopper for containing a bulk supply of uncut tea leaves, a pair of cooperating cutting rollers associated with said hopper and arranged to effect breaking up of the uncut tea leaves into relatively smaller lengths as it passes between the rollers, a second hopper communicating with said first hopper and into which the cut tea is discharged, a continuously operating rotary feeding tube associated with said second hopper for withdrawing and feeding the cut tea leaves therefrom, and control means for discontinuing the operation of said cutting rollers when said second hopper is filled to a predetermined maximum height, said control means including a cam-operated feeler plate arranged to be restrained in its movement by engagement with the top of the accumulated pile of material in said second hopper, and means operatively connected to said feeler plate for terminating the operation of said cutting rollers when the feeler plate is thus restrained, said last named means having provision for again starting the rollers in operation after a predetermined time has elapsed.

3. A tea feeding and cutting mechanism adapted for use in a tea bagging machine comprising, in combination, a hopper having an upper chamber for containing a bulk supply of uncut tea and a lower chamber for containing the cut tea, a pair of rotary cutting rollers disposed between the upper and lower chambers of said hopper for breaking up the tea passing between the rollers from the upper chamber and for discharging the tea into the lower chamber, means for continuously withdrawing and feeding the cut tea from said lower chamber, driving means for said rollers, and means for controlling the operation of said cutting rollers in accordance with the supply of cut tea in said lower chamber, said control means including a feeler plate arranged to be restrained in its movement when it engages the top of the pile of cut tea in said lower chamber, pneumatically operated means arranged to effect engagement and disengagement of said driving means, and a solenoid operated air valve arranged to be opened when the feeler arm is restrained to effect disengagement of said driving means for a predetermined time interval.

4. A tea feeding and cutting mechanism adapted for use in a tea bagging machine comprising, in combination, a hopper having an upper chamber for containing a bulk supply of uncut tea and a lower chamber for containing the cut tea, a pair of rotary cutting rollers disposed between the upper and lower chambers of said hopper for breaking up the tea passing between the rollers from the upper chamber and for discharging the tea into the lower chamber, and means for continuously withdrawing and feeding the cut tea from said lower chamber, drive means including a shaft operatively connected to said withdrawing and feeding means and said cutting rollers and including a clutch for said cutting rollers, and means for controlling the operation of said cutting rollers in accordance with the height of the cut tea accumulated in said lower chamber, including a cam-operated feeler plate rockingly mounted in said lower chamber and arranged to be restrained in its movement when it engages the top of the pile of cut tea in said lower chamber, and connections between said feeler plate and said clutch for effecting disengagement of the latter to discontinue the operation of said cutting rollers when the feeler plate is thus restrained.

5. A tea feeding and cutting mechanism adapted for use in a tea bagging machine comprising, in combination, a hopper having an upper chamber for containing a bulk supply of uncut tea and a lower chamber for containing the cut tea, a pair of rotary cutting rollers disposed between the upper and lower chambers of said hopper for breaking up the tea passing between the rollers from the upper chamber and for discharging the tea into the lower chamber, and means for withdrawing and feeding the cut tea from said lower chamber, drive means including a shaft operatively connected to said withdrawing and feeding means and said cutting rollers and including a clutch for said cutting rollers, and means for controlling the operation of said cutting rollers in accordance with the height of the cut tea accumulated in said lower chamber, including a feeler plate rockingly mounted in said lower chamber and arranged to be restrained in its movement when it engages the top of the pile of cut tea in said lower chamber, and connections between said feeler plate and said clutch for effecting disengagement of the latter to discontinue the operation of said cutting rollers when the feeler plate is thus restrained, said connections including an electrical circuit having a pair of contacts arranged to be closed when said feeler plate is restrained in its downwardly rocked movement by the pile of tea, an air cylinder having a piston operatively connected to said clutch, and a solenoid operated air valve arranged to be actuated to discontinue the operation of said cutting rollers when said contacts are closed.

6. A tea feeding and cutting mechanism adapted for use in a tea bagging machine comprising, in combination, a hopper having an upper chamber for containing a bulk supply of uncut tea and a lower chamber for containing the cut tea, a pair of rotary cutting rollers disposed between the upper and lower chambers of said hopper for breaking up the tea passing between the rollers from the upper chamber and for discharging the tea into the lower chamber, and means for withdrawing and feeding the cut tea from said lower chamber, drive means including a shaft operatively connected to said withdrawing and feeding means and said cutting rollers and including a clutch for said cutting rollers, and means for controlling the operation of said cutting rollers in accordance with the height of the cut tea accumulated in said lower chamber, including a feeler plate rockingly mounted in said lower chamber and arranged to be restrained in its movement when it engages the top of the pile of cut tea in said lower chamber, and connections between said feeler plate and said clutch for effecting disengagement of the latter to discontinue the operation of said cutting rollers when the feeler plate is thus restrained, said connections including an electrical circuit having a pair of contacts arranged to be closed when said feeler plate is restrained in its downwardly rocked movement by the pile of tea, an air cylinder having a piston operatively connected to said clutch, and a solenoid operated air valve arranged to be actuated to discontinue the operation of said cutting rollers when said contacts are closed, said electrical circuit also including a time delay relay adapted to open said circuit to permit operation of said cutting rollers after a predetermined time has elapsed.

7. In a device of the character described, in combination: a hopper for containing a bulk supply of uncut material; a pair of cooperating cutting rollers associated with said hopper and arranged to effect breaking up of the uncut material into relatively smaller pieces as it passes between the rollers; a second hopper disposed below said cutting rollers and into which the cut material is discharged from said rollers; driven means for withdrawing the cut material from said second hopper; means for continuously driving said material withdrawing means and said cutting rollers; and means responsive to the accumulation of a predetermined height of cut material in said second hopper for disabling the drive of said cutting rollers without interrupting the driving of said material withdrawing means.

8. A device as defined in claim 7, in which the disabling means includes a timing element for automatically maintaining the driving of said cutting rollers interrupted for a fixed period of time independent of the amount of material withdrawn from said second hopper.

9. In a device of the character described, in combination: a hopper for containing a bulk supply of uncut material; a pair of cooperating cutting rollers associated with said hopper and arranged to effect breaking up of the uncut material into relatively smaller pieces as it passes between the rollers; a second hopper disposed below said cutting rollers and into which the cut material is discharged from said rollers; rotatable means for withdrawing the cut material from said second hopper; a drive shaft for continuously driving said material withdrawing means; means including a clutch driven from said drive shaft for effecting driving of said cutting rollers; and means responsive to the accumulation of a predetermined height of cut material in said second hopper for operating said clutch to interrupt the driving of said cutting rollers, said last-mentioned means including a time delay element for automatically maintaining said clutch disengaged for a predetermined time interval while said material withdrawing means is withdrawing material from said second hopper.

LAWRENCE F. BLACKWELL.

REFERENCES CITED

The following references are of record in the file of this patent:

UNITED STATES PATENTS

| Number | Name | Date |
| --- | --- | --- |
| 176,281 | Cochrane and Hendy | Apr. 18, 1876 |
| 1,686,435 | Chance | Oct. 2, 1928 |
| 1,967,022 | Chandler | July 17, 1934 |
| 2,059,514 | Frediani | Nov. 3, 1936 |
| 2,235,928 | Hardinge | Mar. 25, 1941 |
| 2,286,585 | Simpson | June 16, 1942 |
| 2,408,221 | Michel | Sept. 24, 1946 |

FOREIGN PATENTS

| Number | Country | Date |
| --- | --- | --- |
| 13,526 | France | Apr. 29, 1911 |